March 12, 1957 H. J. MODREY 2,784,759
NUT AND SLOTTED RETAINER THEREFOR ADAPTED
FOR ASSEMBLY WITH TUBULAR MEMBERS
Filed Nov. 14, 1955
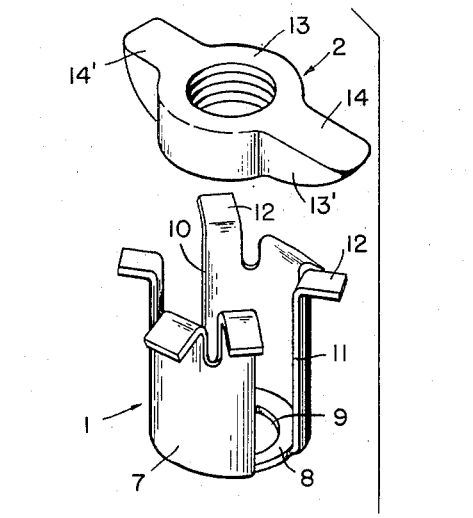
FIG. 1
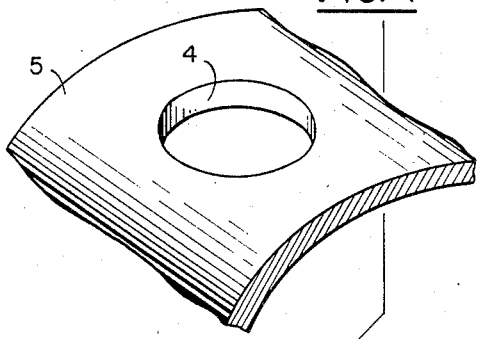
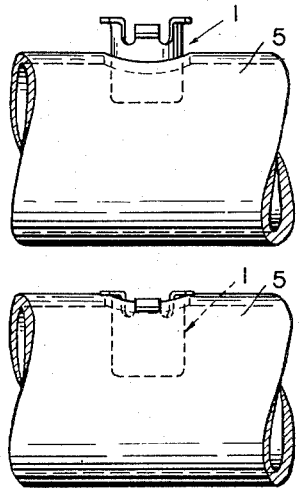
FIG. 2
FIG. 3
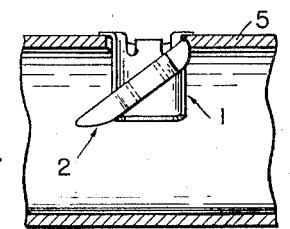
FIG. 4
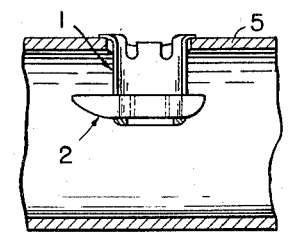
FIG. 5
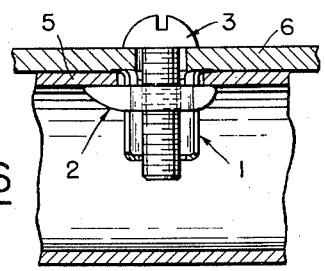
FIG. 6
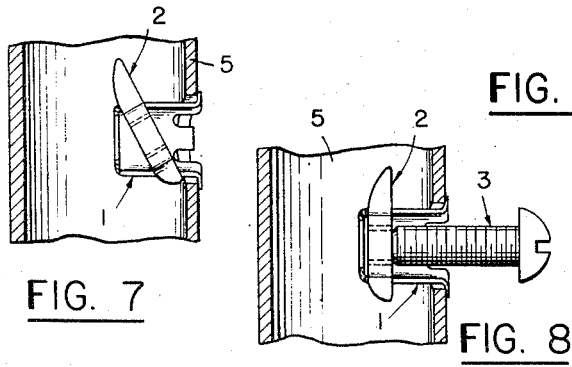
FIG. 7
FIG. 8
INVENTOR.
HENRY J. MODREY
BY Heine and Nydick
ATTORNEYS

United States Patent Office 2,784,759
Patented Mar. 12, 1957

2,784,759

NUT AND SLOTTED RETAINER THEREFOR ADAPTED FOR ASSEMBLY WITH TUBULAR MEMBERS

Henry J. Modrey, Stamford, Conn.

Application November 14, 1955, Serial No. 546,470

10 Claims. (Cl. 151—41.75)

The present invention relates to self-anchoring repeatedly usable fasteners, and more particularly to blind fasteners for rigidly joining one component to another component.

An advantageous though not exclusive field of application of the invention is the fastening of panels or tubes to tubing as is used for instance in the manufacture of tubular furniture and in the construction of airframes.

There are known several designs of blind fasteners of the general kind above referred to. However, the fastener designs as heretofore known, require a specially shaped mounting hole and/or can be tightened only when held or secured against involuntary rotation. These requirements severely limit the applicability of conventional fasteners and materially increase the costs of manufacture and assembly thereof. Other known designs of blind fasteners known as wall anchors or toggle bolts have the additional disadvantage that the protruding portion of the fasteners is so long that they cannot be used inside of tubing generally used in the fields of application previously mentioned.

Accordingly, one of the objects of the present invention is to provide a novel and improved re-usable blind fastener of the general kind above referred to, which in contrast to fasteners as heretofore known is suitable for mounting in a round hole. As is evident, the provision of round holes for instance, by drilling is more convenient and less expensive than the provision of specially shaped holes, such as square holes or round holes having lateral extensions.

Another object of the invention is to provide a novel and improved blind fastener which anchors itself prior to tightening in and to the component on which it is to be mounted without requiring special anchoring means in said component or external holding during the tightening operation.

Still another object of the invention is to provide a novel and improved blind fastener the overall length of which is short enough to permit accommodation of the fastener within the bore of comparatively narrow tubing.

Other and further objects, features and advantages of the invention will be pointed out hereinafter and set forth in the appended claims forming part of the application.

In the accompanying drawing, a preferred embodiment of the invention is shown by way of illustration and not by way of limitation.

In the drawing:

Fig. 1 is an exploded view of a fastener according to the invention except of the mounting bolt of the fastener.

Fig. 2 is a view of the cage of the fastener partly inserted in a hole through the wall of a horizontally disposed tube.

Fig. 3 is a view of the fastener fully inserted.

Fig. 4 is a sectional view of the mounting nut of the fastener in an intermediate position in the cage.

Fig. 5 is a view of the mounting nut fully inserted.

Fig. 6 is a sectional view of the fastener fully assembled and joining a panel or plate to the tube.

Fig. 7 is a view similar to Fig. 4, but showing the tube vertically disposed, and Fig. 8 is a sectional view showing the mounting nut fully inserted and the mounting bolt threaded in the nut.

Referring now to the figures in detail, the fastener according to the invention comprises a cage generally designated by 1, a radially elongated mounting nut generally designated by 2 and a headed mounting bolt or screw generally designated by 3. In the exemplification of the invention, the fastener is designed to be inserted in a circular hole 4 through the wall of a tube 5 for the purpose of joining a panel 6 to the tube.

Cage 1 is shown as comprising a generally cylindrical springy sleeve 7 which fits hole 4, preferably with a slight friction fit. The sleeve is open at one end and partly closed at the other end by a wall member 8 having a hole 9 therethrough for the passage of bolt 3. However, it is also possible and within the scope of the invention to employ a closed wall 9 in which case the length of the sleeve and the length of the bolt must be correlated to provide sufficient space for the bolt when tightened. The wall of sleeve 7 is shown as including two diametrically opposite longitudinal slots 10 and 11. The open or upper end of the sleeve is formed with retaining means to prevent rotation of the cage within the round hole. These retaining means are shown as several circumferential spaced, outwardly turned lips 12. As can be clearly seen in Fig. 1, these lips are situated at different levels relative to the lower rim of the sleeve for the purpose of conforming to the curvature of the hole perimeter in the cylindrical wall of tube 5. More specifically, the disposition of lips 12 is such that all the lips conform to the curved outer surface of the tube wall when the cage is in the fully inserted position of Fig. 3. Such engagement effectively prevents rotation of the cage relative to the tube. It further serves to position cage slots 10 and 11 so that the slots are axially aligned within the tube 5.

In this connection it may be mentioned that cage 1 may also be fitted in a plane panel. When used for insertion in a plane panel, lips 12 must of course be disposed in the same plane and the cylindrical wall of sleeve 7 should fit the hole in the panel with a friction fit for a purpose which will be more fully explained hereinafter.

Mounting nut 2 comprises a cylindrical middle portion 13 from which extend two peripheral protrusions or arms 14 and 14' disposed diametrically opposite. As can best be seen in Fig. 1, arm 14 is longer than arm 14' and has rounded corners. The bottom of the nut, especially of arm 14 is rounded at 13' to give the bottom a shape which may be described as boat-shaped.

The diameter of the circular end of the nut fits loosely the inner diameter of sleeve 7 and the diametrical width of extensions 13 is such that the extension will extend through slots 10 and 11 when the nut is inserted in sleeve 7. The axial length of sleeve 7 and the maximum diametrical width of extensions 13 are so correlated that the nut can be inserted in the cage when the latter is mounted in the tube.

The operation of the fastener as hereinbefore described, will now be explained in connection with Figs. 2 through 6.

To assemble the fastener cage 1 is first inserted in hole 4 as shown in Figs. 2 and 3. When the cage occupies the position of Fig. 3, all the lips 12 are in engagement with the curved surface of tube 5 to prevent a rotation of the cage relative to the tube and to position slots 10 and 11 in axial alignment with the tube.

If a cage having lips disposed in the same plane is inserted in a flat panel, the frictional engagement between the lips and the outer surface of the panel and between the springy side walls of the cage, now slightly compressed, in engagement with the rim of the hole will resist rotation of the cage relative to the panel to an extent sufficient to permit threading of bolt or screw 3 into nut 2 when the latter is inserted in the cage.

After the cage has been inserted in the tube or the panel, nut 2 is placed in position by dropping the nut in a slanted position into the cage as is shown in Fig. 4. The long arm 14 is inserted first and when it has entered one of the slots 10 or 11, the nut is released. The two arms are so proportioned that the operator can hold the nut by its short arm until the rounded tip of the long arm is safely positioned in one slot. The purpose is to prevent the first inserted arm to drop into hole 9 in the bottom of the cage. The boat-shaped bottom of the nut serves to position the nut in the cage. It provides a cam-like action which effects self-centering of the nut by gravity when the nut is released.

While the cage is shown with two slots and the nut with two arms, it is evident that one nut arm and one cage slot are basically sufficient to prevent rotation of the nut within the cage. In its final position, the nut occupies the position of Fig. 5 in which arms 14 and 14' protrude through slots 10 and 11 respectively. As a result, rotation of the nut relative to cage 1 is prevented, the rotation of the cage relative to the tube or the panel being prevented or at least impeded as previously described.

The fastener is now ready for joining panel 6 to the tube by screwing bolt or screw 3 into nut 5. When bolt 3 is tightened nut 2 will rise within the slots until finally panel 6 and tube 5 are rigidly joined as is shown in Fig. 6.

As appears from the previous description of the function of the fastener none of the components thereof undergoes a permanent deformation when the fastener is tightened. This affords the advantage that the fastener can be readily re-used in contrast to known fastener designs the components of which are permanently deformed when the fasteners are tightened thereby limiting the use of such fasteners to a single fastening operation.

Figs. 7 and 8 illustrate the assembly of the fastener in a vertically disposed tube. The fastener is assembled in a vertical tube in the same manner as previously described except that nut 2 cannot be dropped into the position corresponding to the position of Fig. 5 but is pushed into the same by the pressure of the tip of screw 3. The boat-shaped bottom of the nut again acts as a cam guiding the nut into the position of Fig. 8 in response to the pressure of the screw.

As is evident, the usefulness of a fastener according to the invention is not limited to either a horizontal or vertical position, but the fastener may be assembled in any position of the tube including an upside down position. The only difference is that in certain positions of the tube, the nut will generally reach its operational position by its own weight whereas in other tube positions it is pushed into the same by the pressure of the screw.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A blind fastener adapted for mounting in a round hole through an otherwise unbroken surface of a curved wall member, said fastener comprising a generally cylindrical cage open at one end and formed with at least one longitudinal slot, said cage having a length in excess of the thickness of the wall member in which it is to be mounted and at its open end laterally protruding retaining means substantially conforming to the curvature of the curved wall member for abutment therewith upon insertion of the cage in the hole to impede rotation of the cage in the hole of the wall member, and a mounting nut adapted to receive a mounting bolt and having a peripheral protrusion, the maximum width of the nut across said protrusion being in excess of the inner diameter of the cage, the remaining peripheral outline of the nut fitting the cage diameter whereby said protrusion extends through said cage slot when the nut is positioned transversely of the axis of the cage to prevent rotation of the nut relative to the cage.

2. A blind fastener adapted for mounting in a round hole through an otherwise unbroken surface of a curved wall member, said fastener comprising a generally cylindrical cage open at one end and formed with two longitudinal slots, said cage having a length in excess of the thickness of the wall member in which it is to be mounted and at its open end laterally protruding retaining means substantially conforming to the curvature of the curved wall member for abutment therewith upon insertion of the cage in the hole to impede rotation of the cage in the hole of the wall member, and a mounting nut adapted to receive a fastening bolt, said nut having peripheral extensions the maximum diametrical width of which is in excess of the inner diameter of the cage and correlated with the diameter and the length of the cage so as to permit insertion of the nut in the cage at a slant relative to the axis of the cage whereby the extensions of nut protrude through said cage slots in a position of the nut transversely of the axis of the cage to permit rotation of the nut relative to the cage.

3. A blind fastener adapted for mounting in a round hole through an otherwise unbroken surface of a curved wall member, said fastener comprising a generally cylindrical cage open at one end and formed with two longitudinal slots disposed diametrically opposite, said cage having at its open end laterally protruding retaining means substantially conforming to the curvature of the curved wall member for abutment therewith upon insertion of the cage in the hole to impede rotation of the cage in the hole of the wall member, and a mounting nut adapted to receive a fastening bolt, said nut having peripheral extensions disposed diametrically opposite, the maximum diametrical width of said extensions being in excess of the inner diameter of the cage and correlated with the diameter of the cage so as to permit insertion of the nut in the cage at a slant relative to the axis of the cage whereby the extensions of the nut protrude through said cage slots in a position of the nut transversely of the axis of the cage to prevent rotation of the nut relative to the cage.

4. A blind fastener adapted for mounting in a round hole through the otherwise unbroken wall of a tube, said fastener comprising a generally cylindrical cage open at one end and formed with two longitudinal slots, said cage having at its open end retaining means in form of radial lips each engageable with spaced portions of the curved tube wall portion defining said hole to prevent rotation of the cage relative to the tube, and a mounting nut adapted to receive a mounting bolt, said nut having peripheral extensions the maximum diametrical width of which is in excess of the inner diameter of the cage and correlated with the diameter of said cage so as to permit insertion of the nut in the cage at a slant relative to the cage axis whereby the extensions of the nut protrude through said cage slots in a position of the nut transversely of the axis of the cage to prevent rotation of the nut relative to the cage.

5. A blind fastener adapted for mounting in a round hole through an otherwise unbroken wall surface of a tube, said fastener comprising a generally cylindrical cage open at one end and formed with two longitudinal slots disposed diametrically opposite, said cage having retaining means at one end, said retaining means including outwardly directed protrusions disposed at different levels of the axial length of the cage, said different levels substantially matching the contour of the tube surface adjacent to the hole for engagement of the protrusions with spaced portions of the curved rim of said tube hole upon insertion of the cage in the hole to prevent rotation of the cage relative to the tube, and a mounting nut adapted to receive a fastening bolt, said nut having peripheral extensions disposed diametrically opposite, the maximum diametrical width of said extensions being in excess of the inner diameter of the cage and correlated with the diameter of the cage so as to permit insertion of the nut in the cage at a slant relative to the axis of the cage whereby the extensions of the nut protrude through said cage slots in a position of the nut transversely of the axis of the cage to prevent rotation of the nut relative to the cage.

6. A blind fastener according to claim 5, wherein said protrusions are in form of lips bent out of the material of the cage.

7. A blind fastener according to claim 3, wherein said extensions of the nut are in form of radial arms of unequal length whereby the longer arm is insertable in one slot while the other arm is held by the operator.

8. A blind fastener according to claim 7, wherein the bottom of the nut and its arms is generally boat-shaped to guide the nut into its transverse position by cam-like action.

9. In a tubing assembly, a generally cylindrical tube having a round hole through an otherwise unbroken wall surface of a cylindrical tube, a cylindrical cage open at one end and formed with at least one longitudinal slot, said cage having a length in excess of the thickness of the tube wall member and at its open end retaining means in form of several radial extensions each positioned to engage a portion of the curved tube wall defining said hole upon insertion of said cage in said hole to prevent rotation of the cage relative to the tube, and a mounting nut adapted to receive a mounting bolt and having a peripheral protrusion disposed within said cage with said protrusion extending through said slot to prevent rotation of said nut relative to said cage.

10. A tubing assembly according to claim 9, wherein said radial extensions are disposed at different levels of the actual length of the cage, said different levels substantially matching the curvature of the tube surface adjacent to the hole.

References Cited in the file of this patent

UNITED STATES PATENTS

| 1,912,100 | Rosenberg | May 30, 1933 |
| 1,958,497 | Rivers | May 15, 1934 |

FOREIGN PATENTS

| 713,577 | Great Britain | Aug. 11, 1954 |
| 483,279 | Italy | July 23, 1953 |